US008532198B2

(12) United States Patent
Kumwilaisak et al.

(10) Patent No.: US 8,532,198 B2
(45) Date of Patent: Sep. 10, 2013

(54) BANDING ARTIFACT DETECTION IN DIGITAL VIDEO CONTENT

(75) Inventors: Wuttipong Kumwilaisak, Bangkok (TH); Gokce Dane, San Diego, CA (US); Cristina Gomila, Princeton, NJ (US)

(73) Assignee: Thomson LIcensing, Boulogne-Billcourt (FR)

( * ) Notice: Subject to any disclaimer, the term of this patent is extended or adjusted under 35 U.S.C. 154(b) by 346 days.

(21) Appl. No.: 12/448,184

(22) PCT Filed: Dec. 19, 2007

(86) PCT No.: PCT/US2007/026035
§ 371 (c)(1),
(2), (4) Date: Jun. 11, 2009

(87) PCT Pub. No.: WO2008/085377
PCT Pub. Date: Jul. 17, 2008

(65) Prior Publication Data
US 2010/0066912 A1  Mar. 18, 2010

Related U.S. Application Data

(60) Provisional application No. 60/877,561, filed on Dec. 28, 2006.

(51) Int. Cl.
*H04N 7/12* (2006.01)
*H04N 11/02* (2006.01)
*H04N 11/04* (2006.01)

(52) U.S. Cl.
USPC ............. 375/240.27; 375/240.08; 375/240.29

(58) Field of Classification Search
None
See application file for complete search history.

(56) References Cited

U.S. PATENT DOCUMENTS

| | | | | |
|---|---|---|---|---|
| 5,598,184 A * | 1/1997 | Barkans | ......................... | 345/597 |
| 6,674,903 B1 * | 1/2004 | Cliquet | ......................... | 382/199 |
| 6,741,750 B1 * | 5/2004 | Moizio | ......................... | 382/254 |
| 7,620,241 B2 * | 11/2009 | Fan et al. | ...................... | 382/167 |
| 2001/0022852 A1 * | 9/2001 | Gicquel et al. | ................ | 382/162 |
| 2003/0035581 A1 * | 2/2003 | Islam | ............................ | 382/199 |

(Continued)

FOREIGN PATENT DOCUMENTS

| | | |
|---|---|---|
| JP | 2004348119 | 12/2004 |
| JP | 2006039172 | 2/2006 |

(Continued)

OTHER PUBLICATIONS

Ahn et al.:"Flat-Region Detection and False Contour Removal in the Digital TV Display", IEEE 2005, XP0010843914.

(Continued)

*Primary Examiner* — Joseph Ustaris
*Assistant Examiner* — Kevin McInnish
(74) *Attorney, Agent, or Firm* — Robert D. Shedd; Paul P. Kiel; Xiaoan Lu (57) ABSTRACT

A method and system for identifying and determining banding artifacts in digital video content composed of a sequence of moving video pictures includes creating a mask image corresponding to a picture from said sequence of moving video pictures based on global gradient changes to detect potential areas containing banding artifacts. The values of the mask image are scaled thereby making banding artifact detection possible using gradient operators. The banding artifacts are then identified/detected based on the local gradients.

9 Claims, 13 Drawing Sheets

(56) References Cited

U.S. PATENT DOCUMENTS

| | | | |
|---|---|---|---|
| 2005/0013486 A1* | 1/2005 | Wiedemann et al. | 382/181 |
| 2005/0100241 A1* | 5/2005 | Kong et al. | 382/268 |
| 2005/0213816 A1* | 9/2005 | Porikli | 382/173 |
| 2007/0217705 A1* | 9/2007 | Lee et al. | 382/251 |
| 2007/0237237 A1* | 10/2007 | Chang et al. | 375/240.21 |

FOREIGN PATENT DOCUMENTS

| | | |
|---|---|---|
| WO | WO2006010276 | 2/2006 |
| WO | WO2006060496 | 6/2006 |
| WO | WO2006131866 | 12/2006 |

OTHER PUBLICATIONS

Atzori et al.:"Adaptive Anisotropic Filtering (AAF) for Real Time Visual Enhancement of MPEG-Coded Video Sequences", IEEE Transactions on Circuits and Systenms for Video Technology, vol. 12, No. 5, May 2002, pp. 285-298, XP0011071823.

Yuan et al.:"Offset-Adaptive Quantization in DCT-based Low-Bitrate Video Coding", IEEE 2004, p. 2739-2743.

Lee et al.:"Blocking Effect Reduction of JPEG Images by Signal Adaptive Filtering", IEEE Transactions on Image Processing, vol. 7, No. 2, Feb. 1998, pp. 229-234, ,XP000730983.

Lee et al.:"Two-Stage False Contour Detection Algorithm using Re-Quantization and Directional Contrast Features and Its Application to Adaptive False Contour Reduction", IEEE 2006, 9.3-1, pp. 377-378.

Lee et al.:"Two-Stage False Contour Detection Using Directional Contrast Features and Its Application to Adaptive False Contour Reduction" IEEE 2006, pp. 179-188, XP002476825.

Luo et al.:"A Triage Method of Determining the Extent of JPEG Compression Artifacts", IEEE ICIP 2002, pp. I-473-I-476, XP0010607363.

Wu et al.:"Video Coding Distortion Classification and Quantitative Impairment Metrics", Proceedings of ICSP' 1996, pp. 962-965, XP0010209488.

Joy et al.:"Reducing False Contours in Quantized Color Images", Comput & Graphics, vol. 20, No. 2, pp. 231-242, 1996.

Daly et al., "Decontouring: prevention and removal of false contour artifacts", Proc. Human Vision and Electronic Imaging IX, SPIE, vol. 5292, pp. 130-149, Jun. 2004, San Jose, CA.

* cited by examiner

BANDING ARTIFACT DETECTION IN DIGITAL VIDEO CONTENT

CROSS REFERENCES

This application is a National Stage Application and claims the benefit, under 35 U.S.C. §365 of International Application PCT/US2007/026035 filed Dec. 19, 2007 which was published in accordance with PCT Article 21(2) on Jul. 17, 2008 in English, and which claims the benefit of U.S. Provisional Patent Application No. 60/877,561 filed Dec. 28, 2006.

BACKGROUND

1. Technical Field

The principles of the present invention relate to banding artifacts which can be present in digital video.

2. Description of Related Art

Digital video is typically captured or produced at high bit depth (16 bits per component for animated content). However, current video encoders and display devices have been designed to compress signals with 8 bits per component or less. The bit depth conversion from higher to lower bit depth can easily create banding artifacts. That is, banding artifacts are perceived as bands of distinctive colors in what should be a gradual color transition.

Similarly, banding artifacts can also be created by the process of compression. Video compression methods aim at finding efficient coding representations for digital video. This can be done by removing the inter-redundancies in both spatial and temporal domains of video contents. Because the human visual system is less sensitive to high frequency components of video, information of the high frequency components is reduced by the quantization process. Even though removing redundancy provides a high compression ratio, the visual video quality is degraded with the introduction of artifacts at the decompressed picture. Banding artifacts can also be introduced in this process. Banding artifacts occur when the quantization process suppresses the film grain or distorts the original contents, which then form the contour-like artifact. This often appears in animation contents and film contents with smooth film grain and smooth gradient changes.

In non real-time encoding applications such as Digital Versatile Disk (DVD) authoring, visual quality is the most important target. Furthermore, with the introduction of high definition formats and higher resolution displays, banding artifacts become more visible to the audience. In order to alleviate or remove banding artifacts, the locations of the banding artifacts must be spotted and evaluated. Using human effort to perform the detection task is not desirable because it consumes a lot of time and energy. Moreover, human detection of banding artifacts is prone to human errors resulting in missing existing artifacts.

As a consequence, there is a major need for methods and the like, which can automatically detect and evaluate the existence of banding artifacts in the reconstructed video contents. Such inventive concepts can dramatically reduce time spent in evaluating the artifacts and enhance the quality of the compressed video.

There are not many solutions that consider the detection and correction of banding artifacts in video contents. In one known method, two-stage contour detection with re-quantization and directional contrast features is proposed. Such a method first removes smooth regions and then applies feature-based filtering to separate false contours. However, this method does not take the original video contents into account for determining banding artifacts. Therefore, such a method can falsely declare banding effect intended by the video producers as banding artifacts. Then, the application of filters to remove these intended banding negatively affects (or degrades) the quality of the encoded video.

As a consequence, there is a need for a new and effective method for detecting banding artifacts that overcomes the shortfalls of the known methods.

SUMMARY

According to one implementation, the method of video processing digital video content includes creating a mask image based on global gradient changes to detect potential areas containing banding artifacts and detecting banding artifacts based on local gradients using gradient operators.

According to another implementation the method of video processing includes dividing a video picture from a sequence of video pictures into blocks of a particular length and a particular height, generating a gradient field using an attribute associated with the blocks, creating a plurality of blobs from elements from the gradient fields, wherein a length of height of the blobs are larger than the length and height of said blocks, and establishing whether an area of the picture corresponding to a blob from the plurality of blobs is an area containing a banding artifact.

The video encoder of the present principles includes a banding artifact detector having an input connected to an output of a reference picture buffer. The detector is configured to create a mask image of a video picture from a sequence of video pictures based on global gradient changes to detect potential areas containing banding artifacts, and scale values of the mask image to enable detection of banding artifacts.

BRIEF DESCRIPTION OF THE DRAWINGS

In the drawings wherein like reference numerals denote similar components throughout the views.

DETAILED DESCRIPTION

Within the description of the invention, the term large binary object or blob is used to describe an area of a video picture where elements of a video picture such as pixels are touching and of a same logical state. A similar use of blob analysis entails identifying elements of a video picture that form a continuous region based upon a common characteristic for such elements as color, hue, and the like, where the common characteristic can be of a particular range. Such examples of the term blob and of blob analysis are not limited to the recited examples herein and are to be applied consistently with the principles of the present invention.

Also, the term video picture used herein is to be representative of video information that is from a sequence of moving video pictures. The various techniques described herein for identifying banding artifacts in a video picture can be applied to a video frame, as the terms video frame, video picture, and video image, are used within the specification synonymously even though video frame, video picture, and video image can have specific meanings relative to different video encoding standards.

Figure 1:
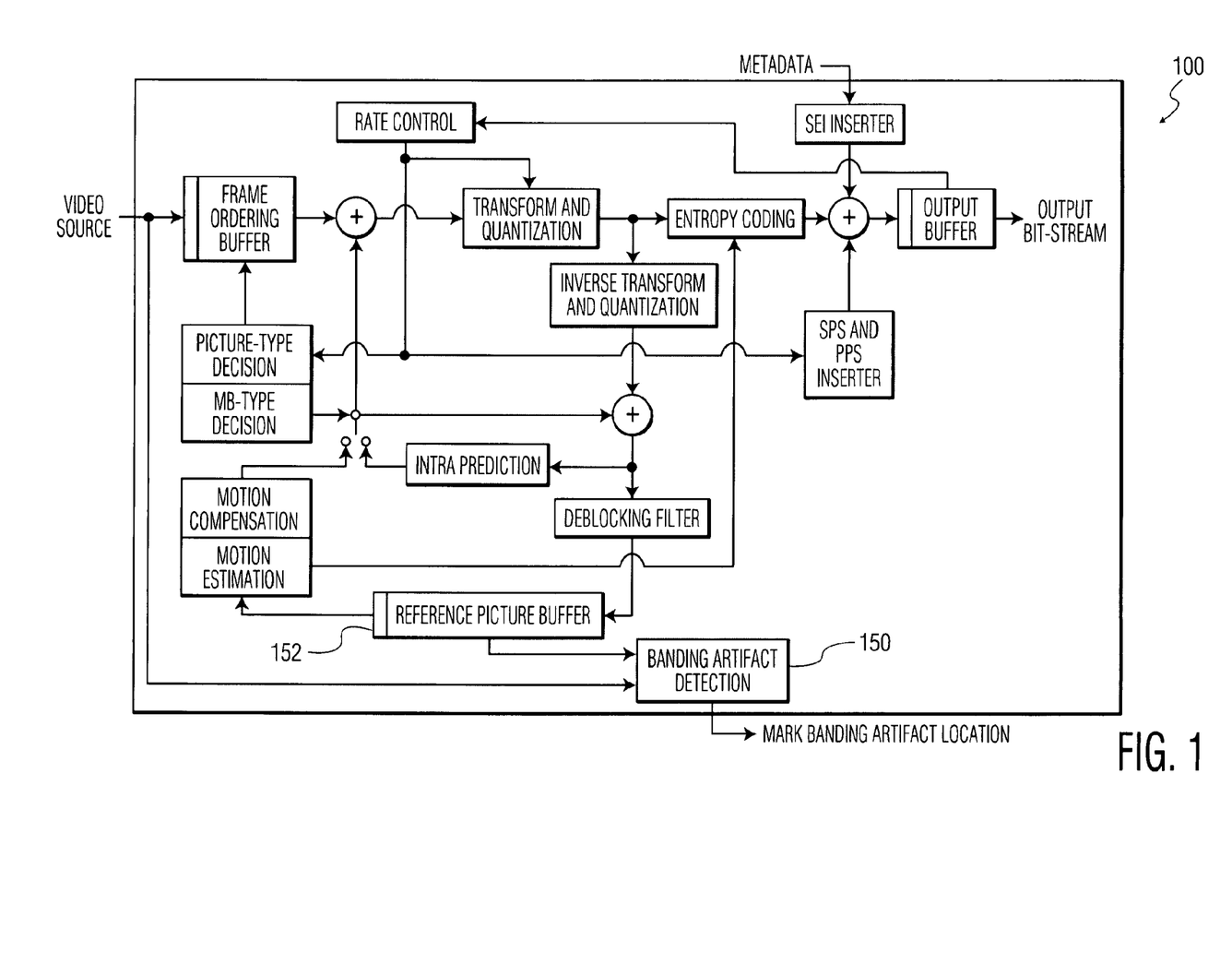
FIG. 1 is block diagram of an exemplary video encoder implementing the banding artifact detector according to an aspect of the present principles.

FIG. 1 shows an exemplary video encoder 100 that can be used in conjunction with the present principles integrating the banding artifact detector 150. The description of the workings of this encoder is known to those of skill in the art and will not be repeated here. In this example, banding artifact detector 150 receives inputs from both the input video source and the reference picture buffer 152.

Figure 2:
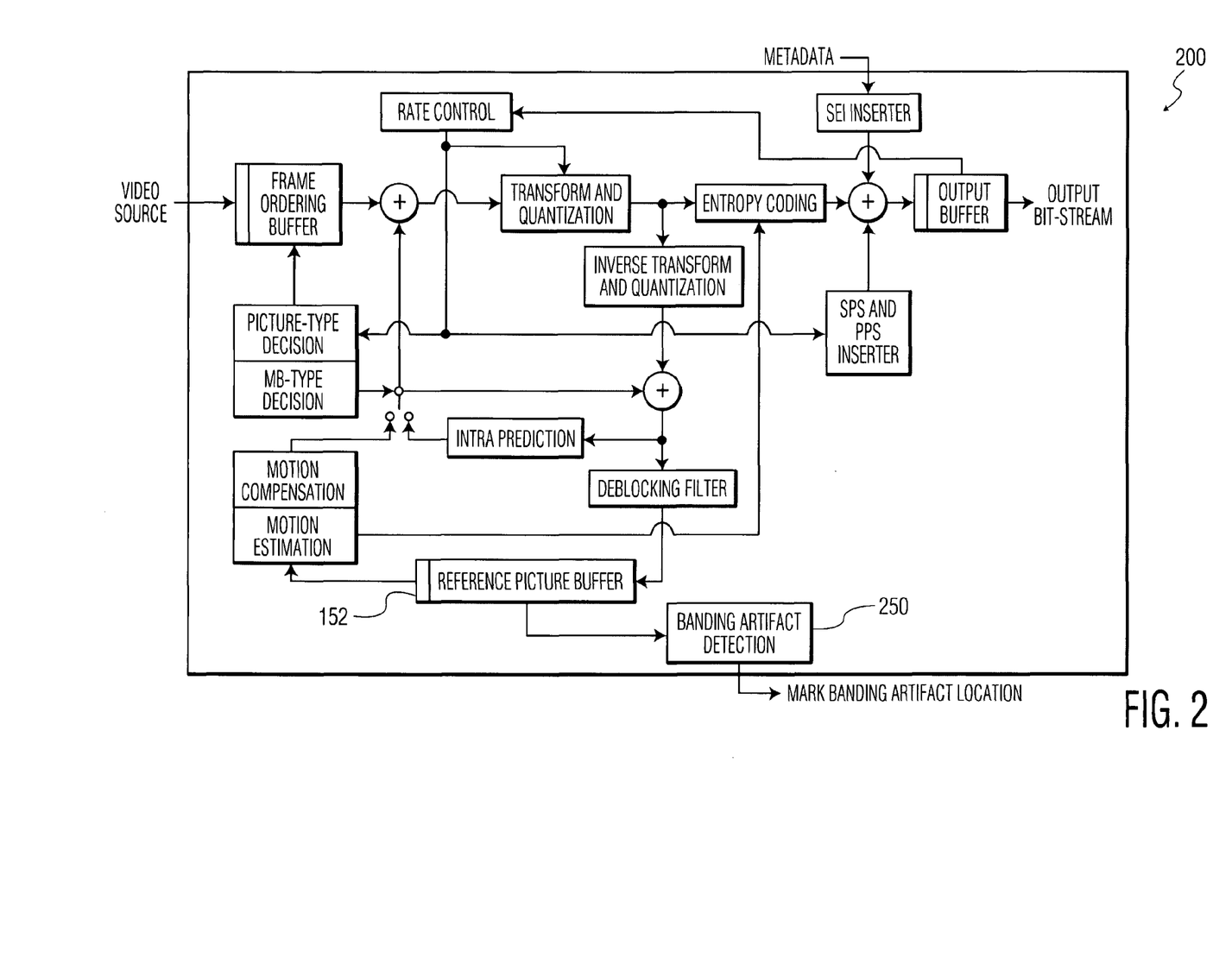
FIG. 2 is a block diagram of an exemplary video encoder implementing the banding artifact detector according to another aspect of the present principles.

FIG. 2 shows another exemplary video encoder 200 where the banding artifact detector 250 does not use or have access to the original video source as a reference for the banding artifact detection process and is only connected to the reference picture buffer 152.

Figure 3A:
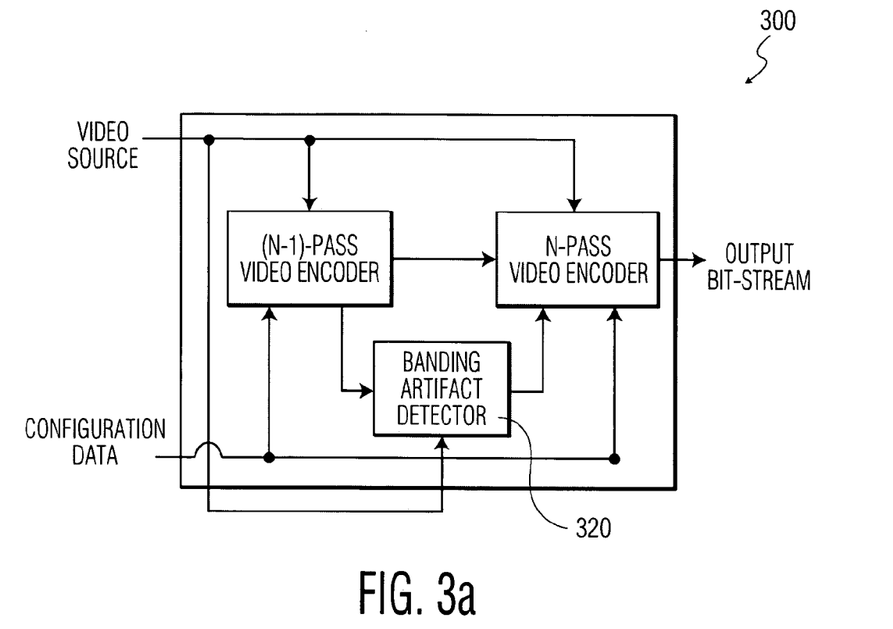
FIG. 3a is a simplified block diagram of an exemplary multi-pass video encoder implementing the banding artifact detector according to an aspect of the present principles.
Figure 3B:
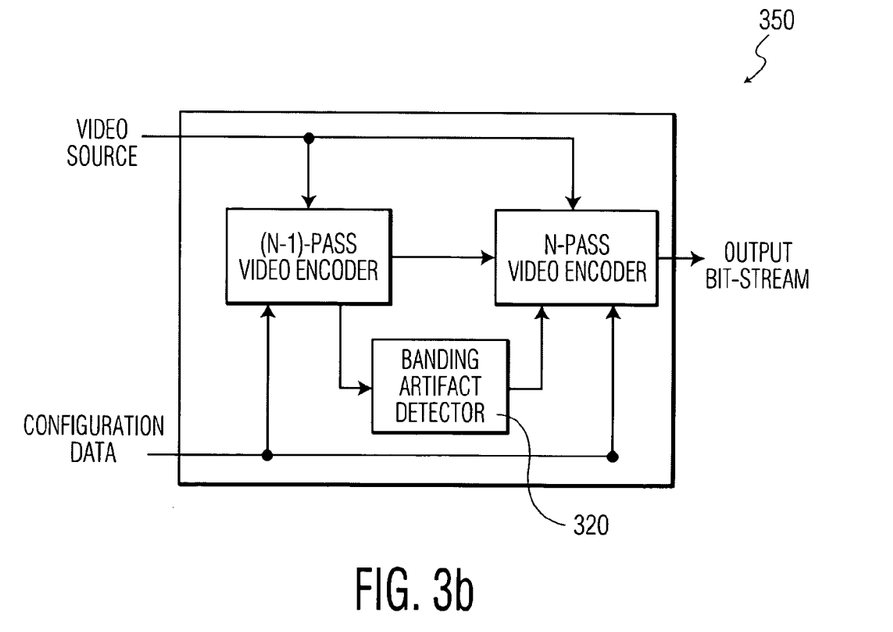
FIG. 3b is a simplified block diagram of an exemplary multi-pass video encoder implementing the banding artifact detector according to another aspect of the present principles.

In the case of multipass video encoders, the banding artifact detection method of the present principles can be used to detect the banding artifacts introduced by previous encoding passes. FIGS. 3a and 3b disclose exemplary embodiments of multi-pass video encoders 300 and 350, respectively, where the banding artifact detector 320 either does or does not use original video source content as reference video information. FIG. 3a shows a scenario where the original video source is available and used as a reference to the banding artifact detection 320, and FIG. 3b shows the case when the original video source is not available and such video information cannot be used as a reference.

In accordance with an implementation of the present principles of the invention, an input of the banding artifact detection comprises video contents after some processing such as bit-depth reduction, reconstructed video contents after compression, and the like. As noted above, when the original video contents are available, such information can be used as a reference for a video processing operation. However, even without the availability of original video source content, the principles of the present invention can still operate with the assumption that no banding artifacts exist in the original video source content.

Some of the principles of the present invention create an output that representing the locations of the banding artifacts.

In accordance with various different implementations of the invention's principles, there are several alternatives to specify such output locations of banding artifacts. For example, banding artifacts can be located at macroblock positions or pixel positions. Alternatively, an indication can be provided as to which pictures are affected banding artifacts without providing further details about the spatial location of the artifacts.

According to other aspects of the present invention, areas of the resulting output video of a video processing operation can be marked where banding artifacts are detected. Such markings can be saved as metadata and used by an operator to perform a manual re-encoding operation in order to remove the banding artifacts. Such marking data is not conveyed in the video data bitstream and will not affect or be used by decoders. Eventually, such marking information could be conveyed as supplemental enhancement information in order to allow a display device to do some specific post processing.

Those of skill in the art will recognize that the methods and apparatus of the present principles can be applied to luminance and color components in the video data. However, in the exemplary discussion below, the method of the present principles is applied only to the luminance component.

Figure 4A:
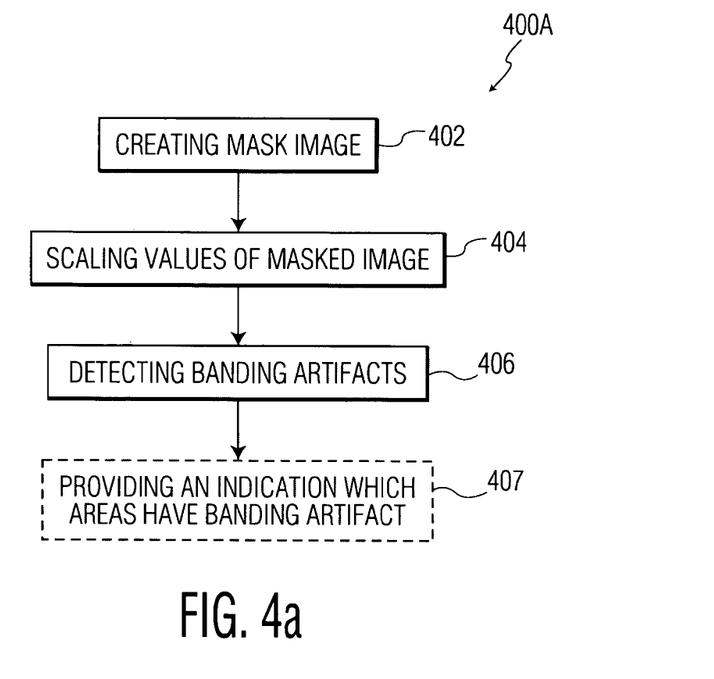
FIG. 4a is a block diagram of the method for detecting banding artifacts according to an implementation of the present principles.

According to one implementation of banding artifact detection method 400a as shown in FIG. 4a, there are three main steps:

1) Creating a mask image (402) to detect potential areas containing banding artifacts. In an exemplary implementation, the mask image can be created based on global gradient changes;

2) Scaling of the mask image (404). This step is optional if the scaling values equal one. Scaling values different from one could be used to ease the detection; and 3) Detecting banding artifacts (406). In the exemplary implementation, this detection step relies on the computation of local gradients.

Beginning with this exemplary embodiment, a mask image is created (402). This creation is based on determined global gradient changes to detect potential areas containing banding artifacts. As discussed above, banding artifacts tend to occur and are highly noticeable in smooth or slow gradient change areas. The present principles of the invention consider such areas to be composed of blocks of pixels (e.g., rectangular or square), even though those of ordinary skill in the art will recognize that these areas could be of composed of any shape (such as circles, regular or irregular polygons, and the like) without departing from the scope of the present principles. Once the mask image is created, values associated with of the mask image are scaled (404), whereby and the banding artifacts are then detected (406). In accordance with one implementation shown in FIG. 4a, an indication as to which areas have a banding effect is provided to the user and/or another application (407).

Figure 4B:
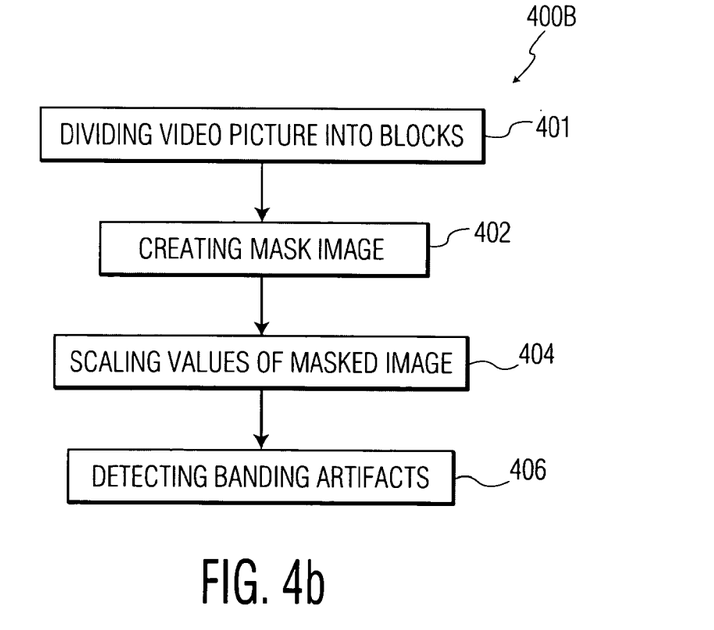
FIG. 4b is a block diagram of the method.
Figure 4C:
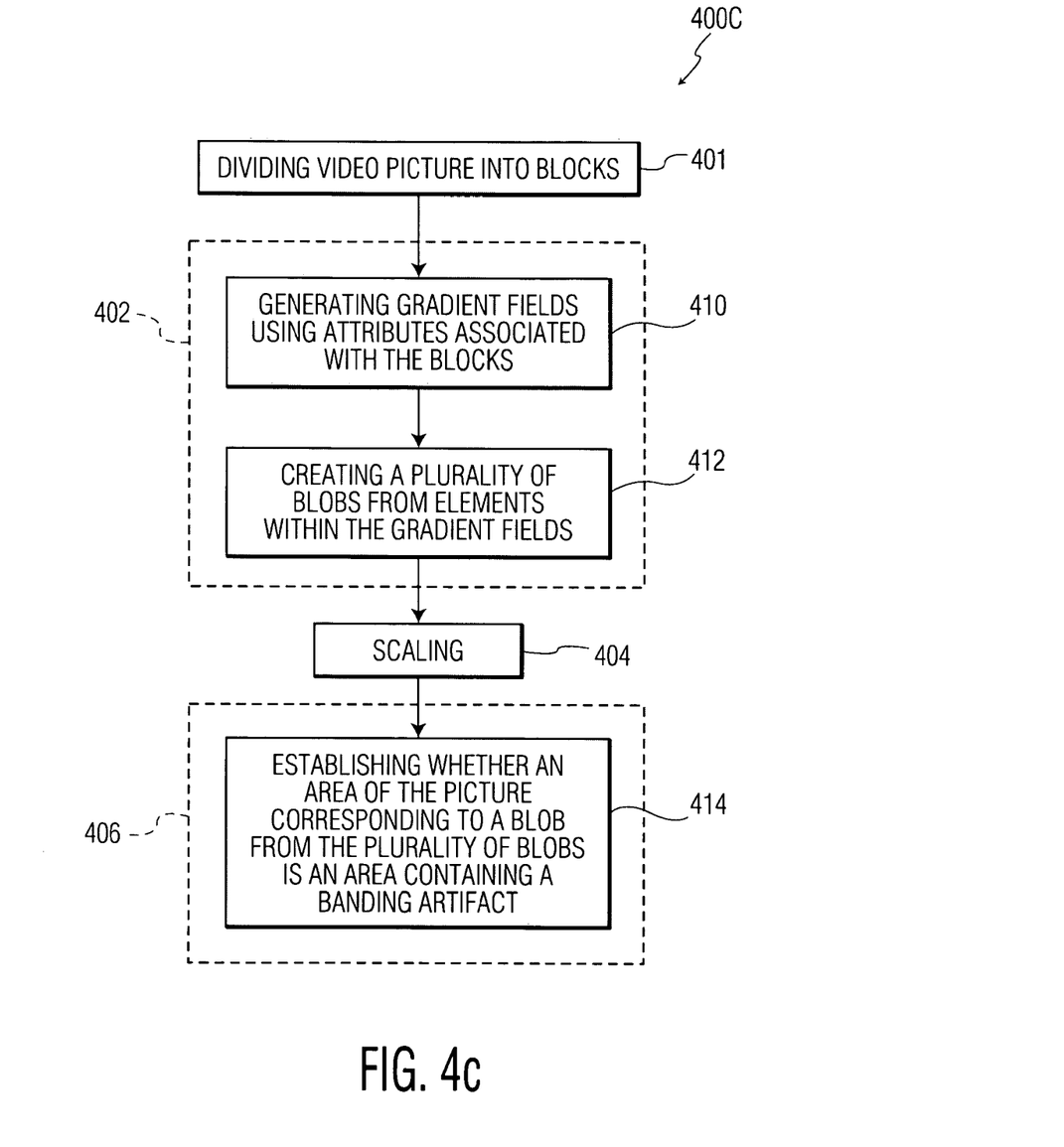
FIG. 4c is a block diagram of the method for detecting banding artifacts according to another implementation of the present principles.

According to another implementation shown in FIG. 4b, before creating the mask image (402), a video picture derived from a video stream (or sequence of video pictures) can be divided into blocks (401). A more detailed flow diagram of the method according to another implementation of the present principles is shown in FIG. 4c. FIG. 4c shows a modified implementation of the method 400c of the present principles where after the division/segmentation of the video picture into blocks (401), gradient fields are generated (410) using attributes associated with the blocks. Once such gradient fields are generated, a plurality of blobs are created (412) from elements within the gradient fields. Once the blobs are created, step 414 establishes whether an area of the picture corresponding to a blob is in an area containing a banding artifact.

Figure 5:
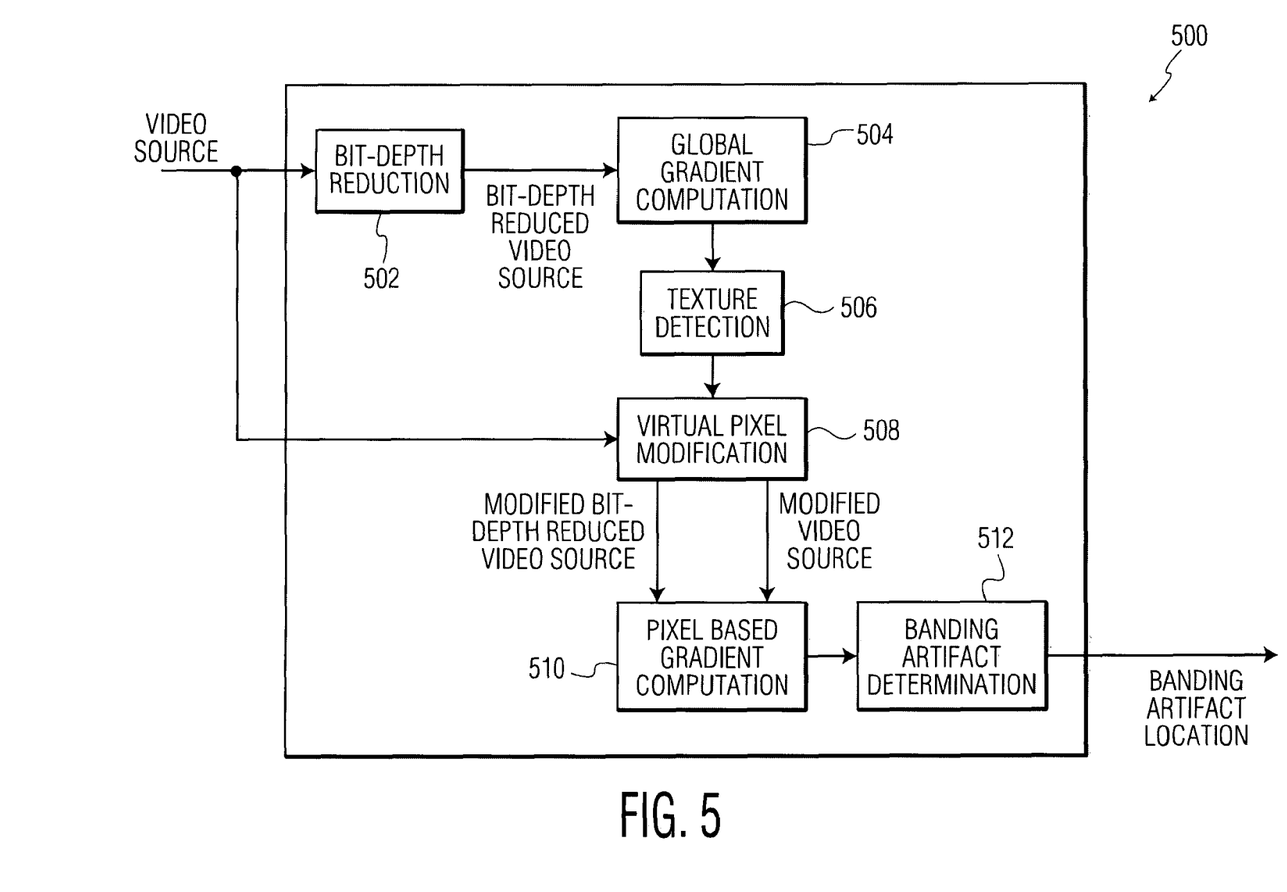
FIG. 5 is a flow diagram of the banding artifact detection method according to an aspect of the present principles.

FIGS. 5-8 show block diagrams of banding artifact detection methods in applications of bit-depth reduction and video compression, when the original video contents corresponding to a sequence of video pictures are available as reference. By way of example, FIG. 5 shows method 500 where an original video source is input to a bit-depth reduction circuit 502 and the virtual pixel modification circuit 508. The bit-depth reduced video source undergoes a global gradient computation 504, texture detection 506, and a virtual pixel modification 508. The output of the virtual pixel modification block is both a modified bit-depth reduced video source and a modified video source. These two inputs are received by a pixel based gradient computation circuit 510, whose output is used to determine the banding artifacts 512. The output provides the locations of the identified banding artifacts.

Figure 6:
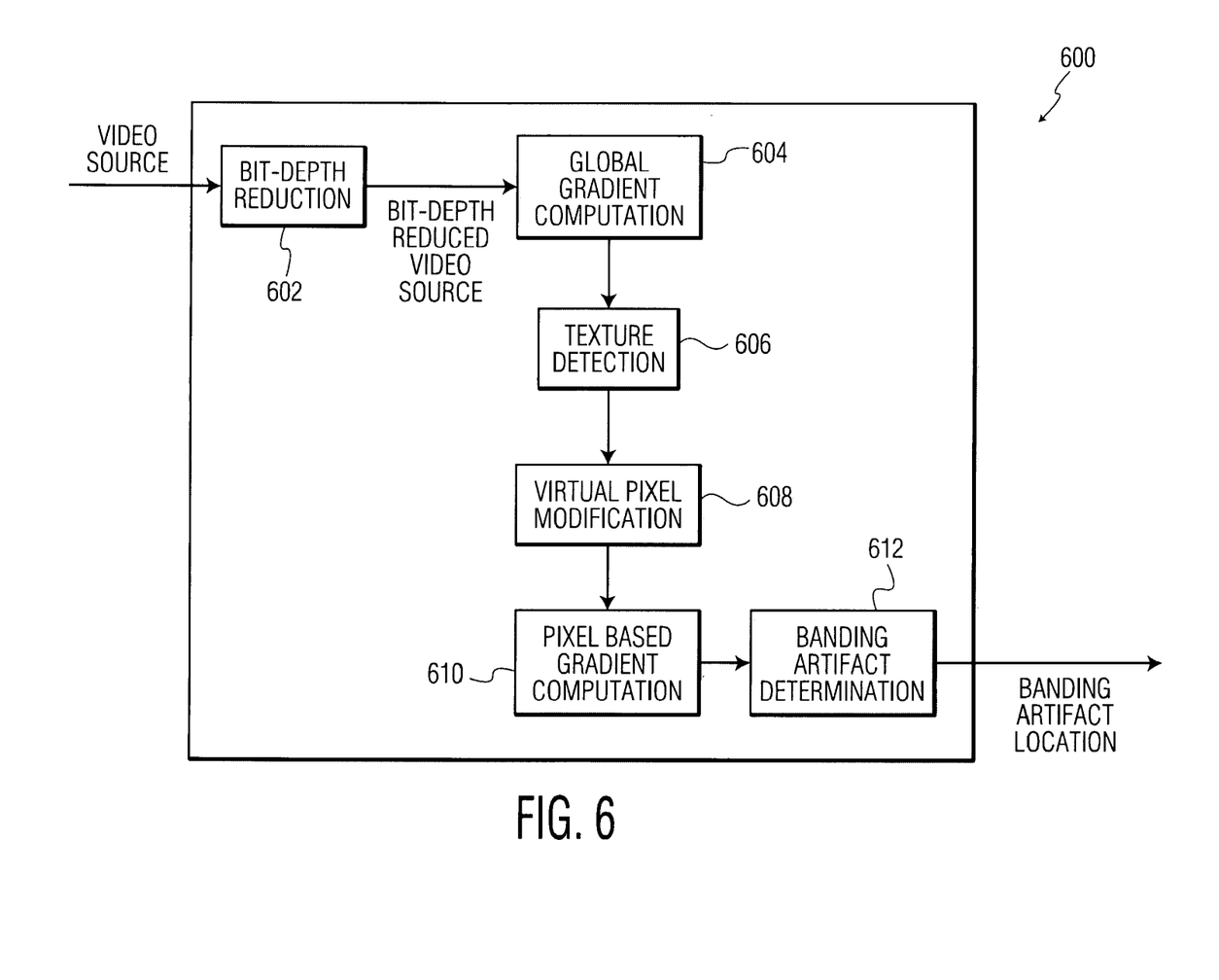
FIG. 6 is a flow diagram of the banding artifact detection method according to another aspect of the present principles.

FIG. 6 shows a modified method 600 of the method 500 shown in FIG. 5. In this implementation, the original video source is not provided to the virtual pixel modification 608. As such, the pixel based gradient computation 610 computes the gradients using only a single input (i.e., the modified bit-depth reduced video source) of the virtual pixel modification circuit 608. As mentioned above, the banding artifact detection 612 would operate under the assumption that there are no banding artifacts in the original video source content.

Figure 7:
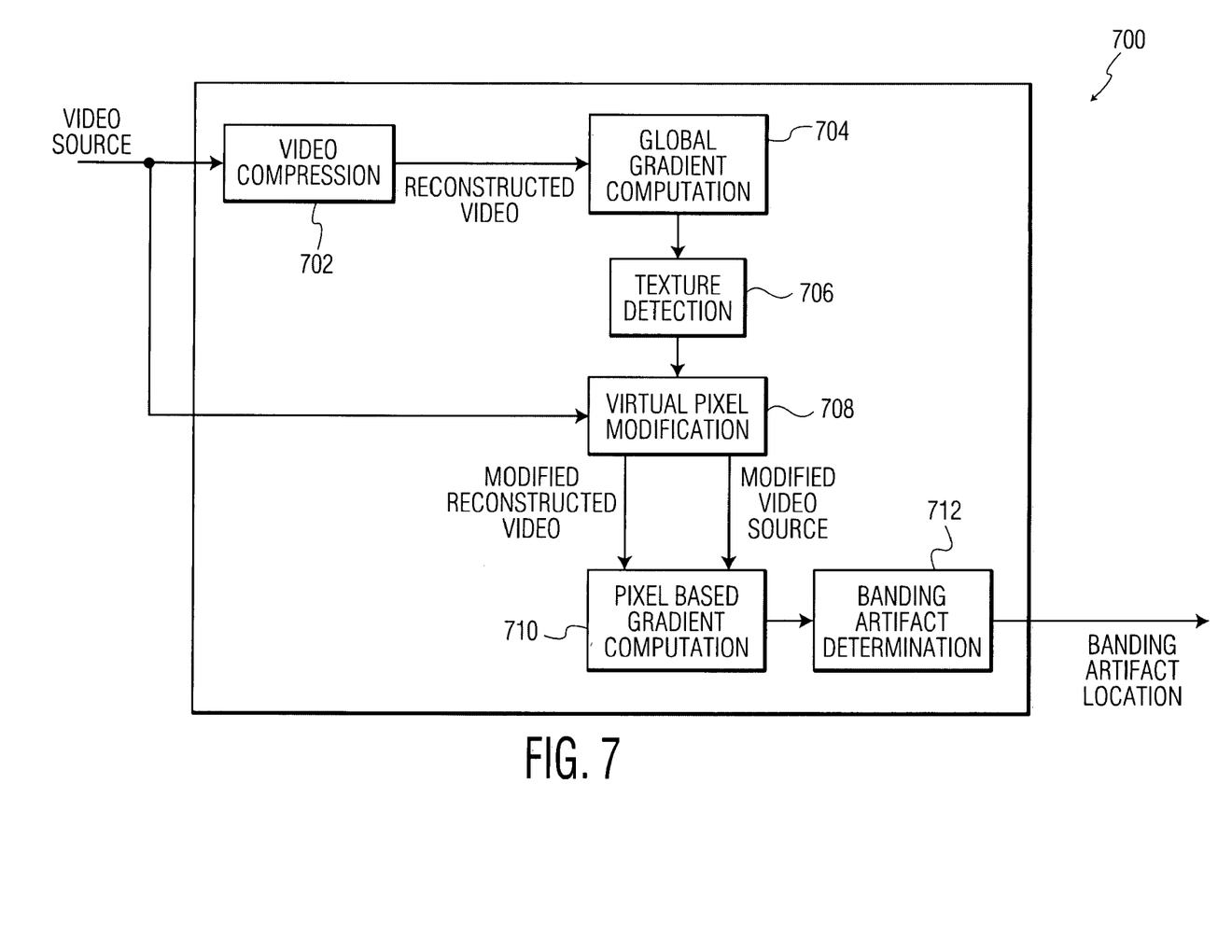
FIG. 7 is a flow diagram of the banding artifact detection method according to another aspect of the present principles.
Figure 8:
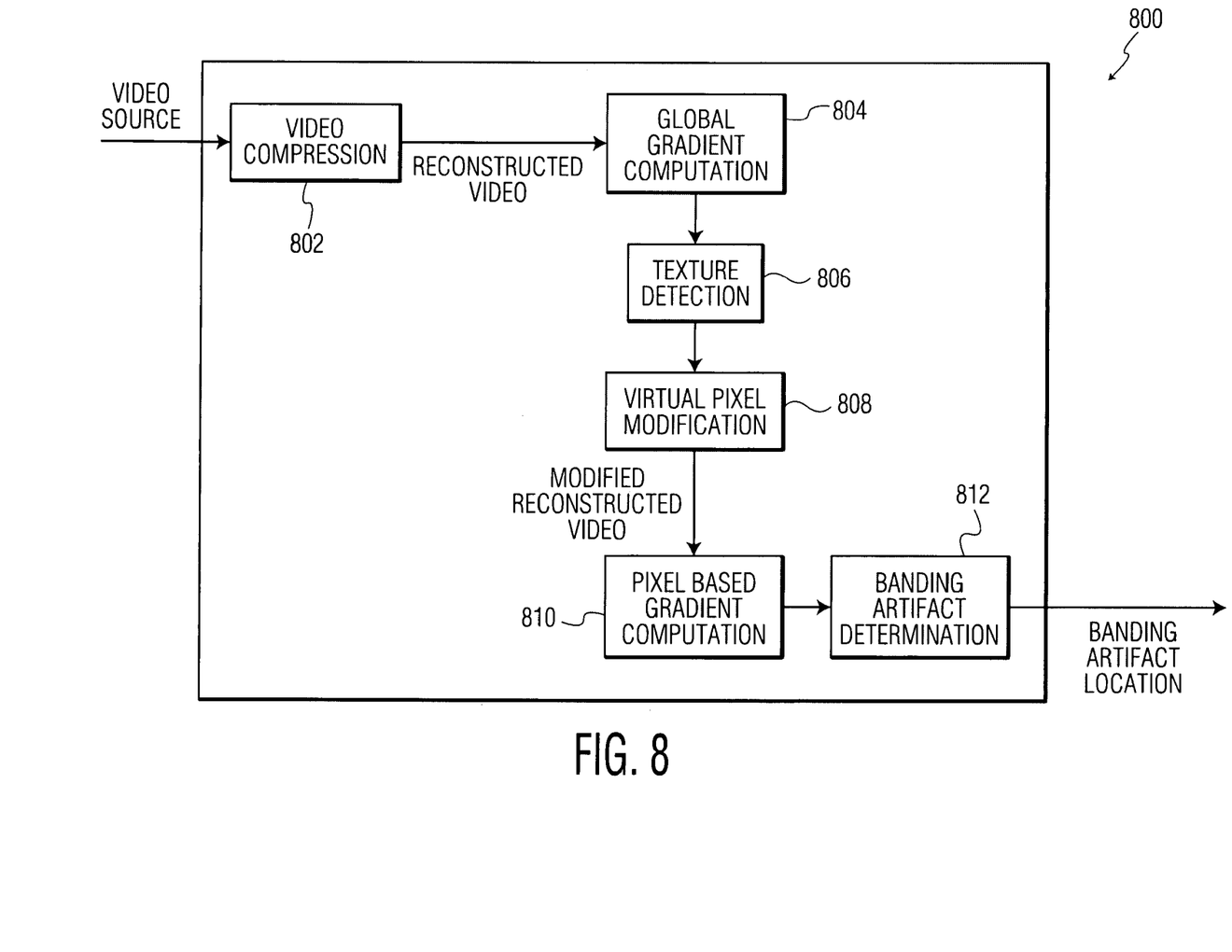
FIG. 8 is a flow diagram of the banding artifact detection method according to yet another aspect of the present principles.

FIGS. 7 and 8 show further modified methods 700 and 800 where instead of bit-depth reduction, the video source is first compressed by a video compression circuit (702, 802) and the reconstructed video is input to the global gradient computation circuit (704, 804). As with the examples shown in FIGS. 5 and 6, FIG. 7 shows the use of the video source information also being input to the virtual pixel modification circuit 708. FIG. 8 shows the scenario with the original video source information is not provided as a reference for the virtual pixel modification circuit 808.

Creating the Mask Image

Figure 9:
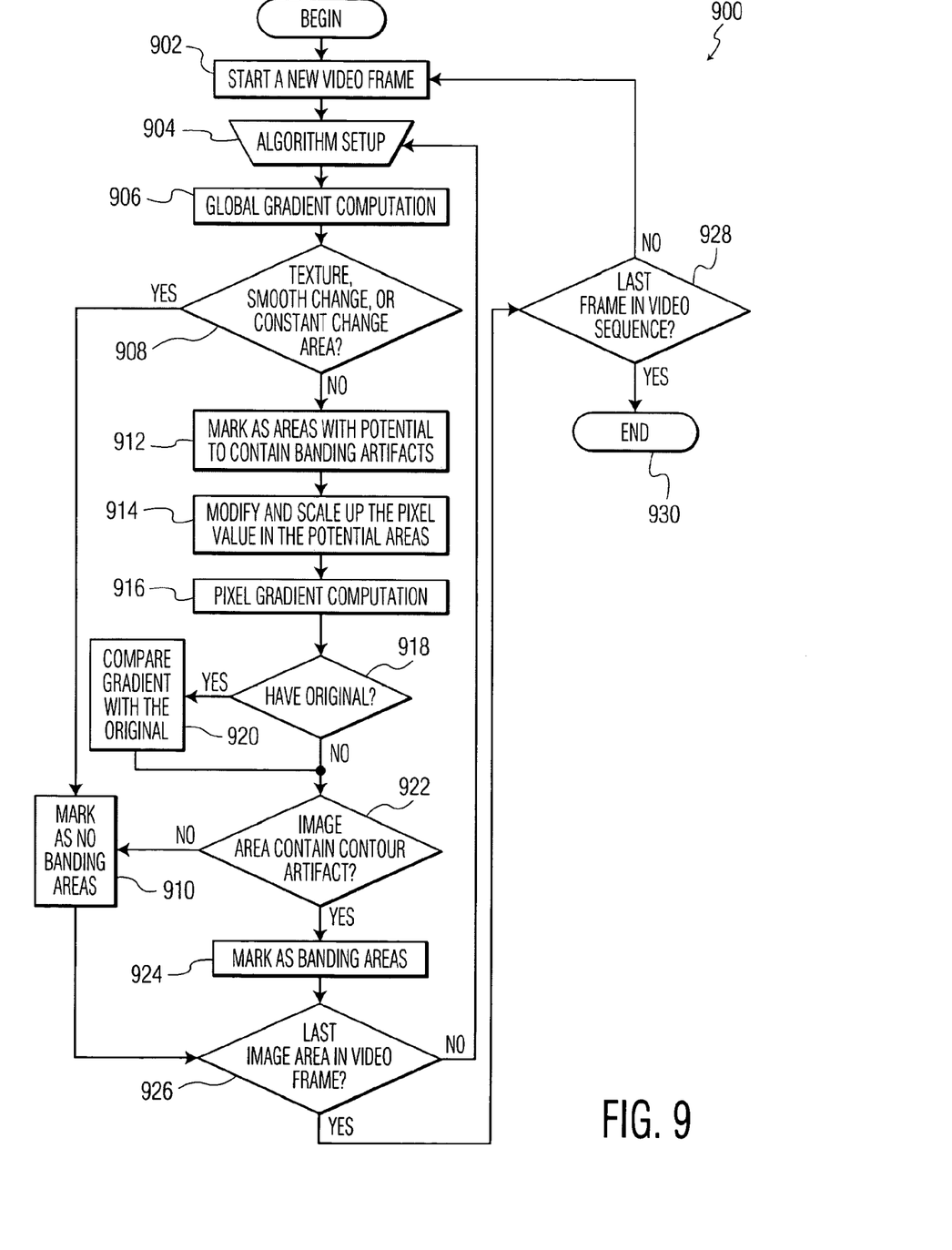
FIG. 9 is a flow diagram of the method for detecting banding artifacts according to an aspect of the present principles.
Figure 10:
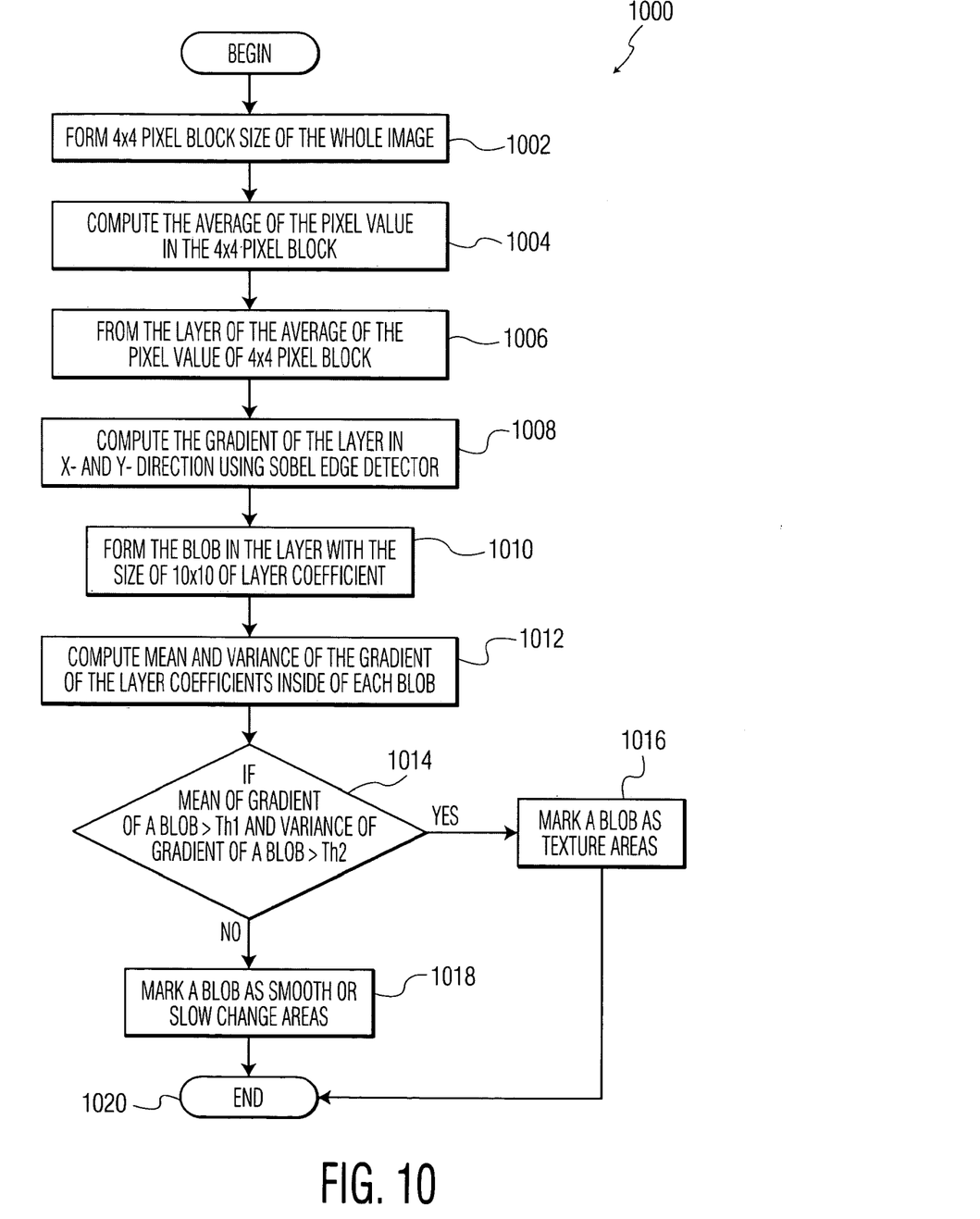
FIG. 10 is a flow diagram of an area categorization process according to an aspect of the present principles.

Referring to FIGS. 9 and 10, in order to create the mask image (402), after the start of a new video picture/frame (902) and the algorithm setup (904), image areas of a particular picture are categorized as to whether such areas contain banding artifacts. To this end, a global gradient of pixel values is computed (906).

Figure 11:
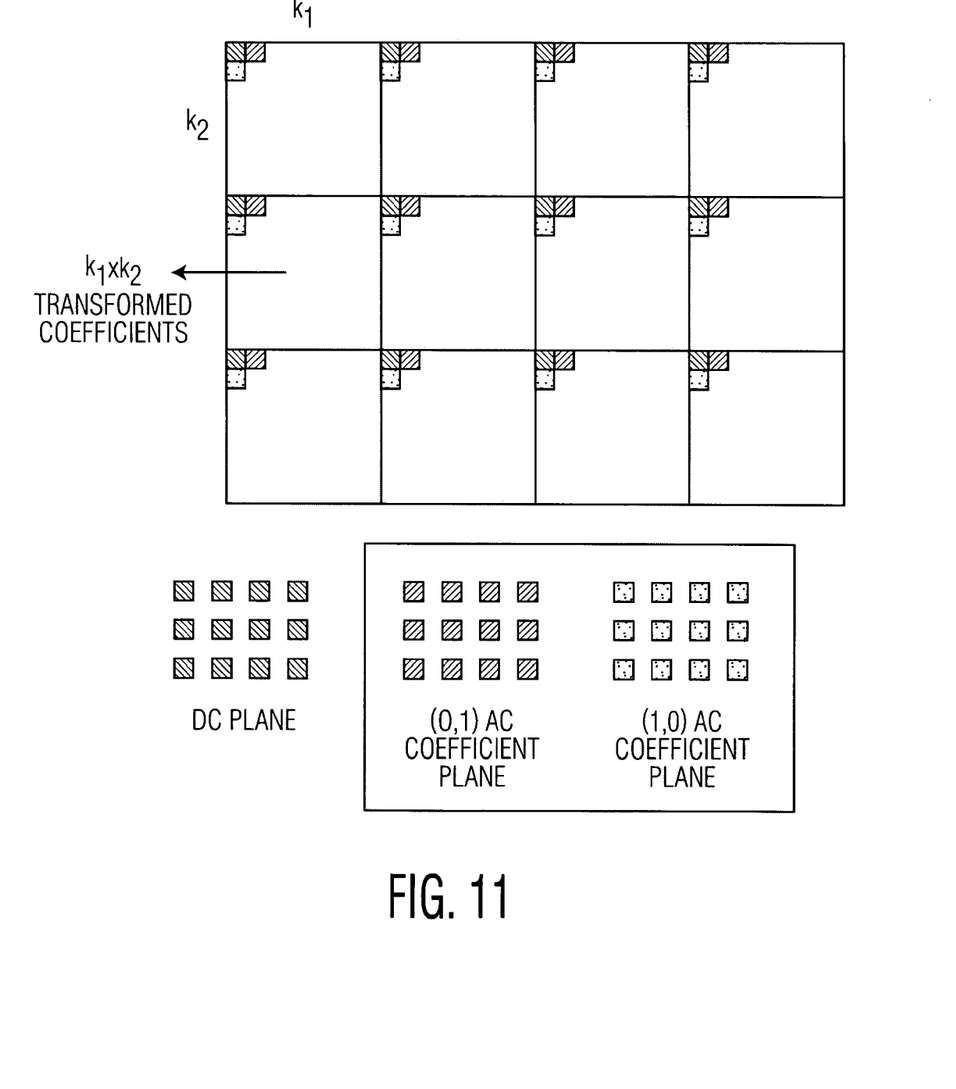
FIG. 11 is schematic view of the obtaining of a average pixel value according to an aspect of the present principles.

An example of an image area categorization process is illustrated by method 1000 shown in FIG. 10. To track the change of global gradient of pixel values, by way of example, a 4×4 pixel block side of the whole image is formed (1002). The average of pixel values of a small pixel block is computed (1004). In a more general case, the averaged pixel value from $k_1 \times k_2$ block size is computed (See FIG. 11). The average value can be obtained by simply averaging pixels or by taking the DC value of a block transform such as the Discrete Cosine Transform (DCT). The values of $k_1$ and $k_2$ can vary and do not have to be equal to each to other. In this example, $k_1=k_2=4$. With the averaged pixel value of each $k_1 \times k_2$ block, the plane (layer) of the averaged pixel value can be formed (1006) as shown in FIG. 11. The plane of averaged pixel value is referred to as "a DC plane". A DC plane is defined as a set of average pixel values having the same position respective to its $k_1 \times k_2$ block. For example, the averaged pixel value of the first $k_1 \times k_2$ block will be in the position (1, 1) of the DC plane. Suppose that a video frame has width and length of a luminance (Y) component equal to 1920 and 1080 pixels respectively. Then, the size of DC plane is equal to $$\frac{1920}{k_1} \times \frac{1080}{k_2}.$$

Next, the gradients of each element in the DC plane are computed (1008). There are many different methods to perform such task. By way of example, one can use 1st order operator such as Roberts Cross, Prewitt, Sobel, or Canny or a 2nd order operator such as Marr-Hildreth or zero-crossings operators to compute the gradients in DC plane. Here, the concept is illustrated using the Sobel operator, where its convolution kernels in x- and y-direction are shown in (1) and (2), respectively.

$$G_x = \begin{bmatrix} -1 & 0 & +1 \\ -2 & 0 & +2 \\ -1 & 0 & +1 \end{bmatrix} \quad (1)$$

$$G_y = \begin{bmatrix} +1 & +2 & +1 \\ 0 & 0 & 0 \\ -1 & -2 & -1 \end{bmatrix} \quad (2)$$

The approximate magnitude of gradient at any position (i,j) in the DC plane can be computed as $$G_{tot}(i,j) = |G_x(i,j)| + |G_y(i,j)| \quad (3)$$

where $G_{tot}(i,j)$, $G_x(i,j)$, $G_y(i,j)$ are the approximate magnitude of gradient, gradient in x-direction, and gradient in y-direction at position (i,j) of the DC plane, respectively.

Next, the mean and variance of blocks $I_1 \times I_2$ samples in the DC plane are computed. In the exemplary embodiment, this computation is referred to as a blob (1010).

In the present example, $I_1=I_2=10$. Note that the blob size corresponds to $I_1 \times k_1$ pixels in width and $I_2 \times k_2$ pixels in height, if a $k_1 \times k_2$ block size of pixels is used in generating the DC plane. In other words, the blob size in pixels is equal to 40×40 in the present example. The mean and variance of gradients in each blob are calculated (1012) and are used to perform the image area categorization. The criteria in image categorization can be stated as follows according to the exemplary implementation: If the mean and variance of blob gradient are greater than their respective thresholds (Th1, Th2), the corresponding blob is marked or declared as a texture area.

The thresholds/values can be provided by the user or read from a table depending on the applications and/or the content type. An increase in the value of the thresholds, will translate into an increase in the number of areas categorized as smooth areas, and most likely will translate into an increase in the number of banding artifacts detected (since the algorithm scan for those in smooth areas). Otherwise, the blob is declared or marked (1018) as a non-texture area (such as a smooth change or flat area), and the marked smooth change or flat areas are thereby indicated as a potential area containing the banding artifacts.

Scaling Values of the Mask Image

In this second step, an exemplary method introduces the option of scaling the values of mask image to make possible the detection of banding artifacts using gradient operators. This step is applied to the processed video picture/frame or the reconstructed video picture/frame depending on whether bit-depth reduction or video compression is used. This scaling step can also be applied to the original video picture/frame, when the original video is available as a reference (See FIGS. 5 and 7). This process is preferred because the difference in the pixel values across banding artifacts can be small and otherwise difficult to detect. According to the present principles, a non-linear scaling operation is used to increase pixel differences in smooth areas. Such transformation will allow for detecting banding artifacts using gradient operators as described in the following sections.

Figure 12:
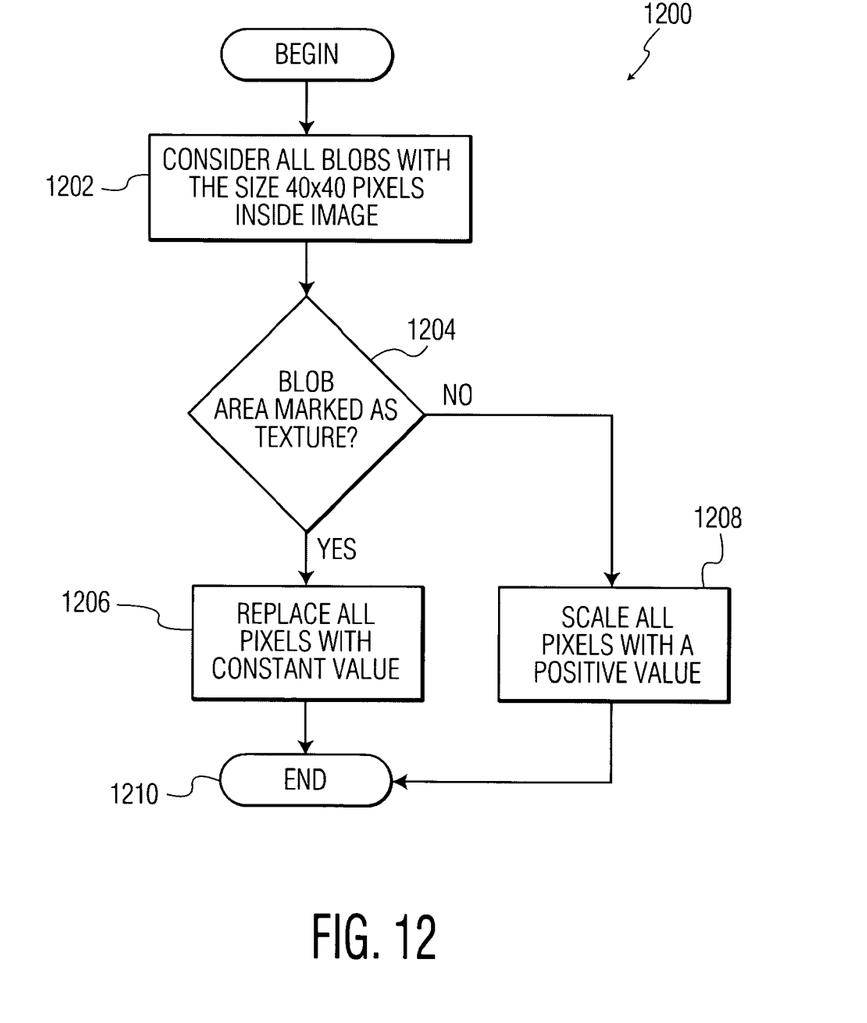
FIG. 12 is flow diagram of non-linear scaling of pixel values according to an aspect of the present principles.

FIG. 12 shows an example of the method 1200 for the non-linear scaling of pixel values according to an implementation of the present principles of the invention. Initially, all blobs inside the image can be considered (1202). A determination then is then made as whether the blob represents an area with or without a texture which affects how the blob area is marked (1204). If the blob area is marked as texture area, all the pixels inside the area are set to a constant value (1206) and the process ends. If the blob area is marked as non-textured area, all pixels are then scaled by a positive value (1208) and the process ends (1210). As a result, of this process, when the gradient operators are applied to the scaled video frame, the gradients in the textured areas will be equal to zero, and those areas will be automatically excluded from the process of banding artifact detection. Therefore, the scaling of pixels in non-textured areas makes existing banding artifacts more apparent and likely to stand out from the surrounding pixels.

Detection of Banding Artifacts Based on Local Gradients

Referring back to FIG. 9, a gradient computation (916) at the pixel level is applied to the previously scaled data of both reconstructed and original images (if such original images are available). As discussed in above, there are many possible gradient detection operators that can be used such as Prewitt, Canny, or Sobel operators. In the present example, the Sobel operators as in (1) and (2) shown above are used as gradient detection operators. A determination is made at this point as to whether or not the original image data is available (918). If yes, the gradient image is compared with the original image (920) and result is provided as an input to the artifact detection process (922). When original video content data is not available, the results from gradient detection operators in this step are compared with a threshold value in order to determine if the image area contains a banding artifact (922). The threshold value used to determine whether a contour should be marked as a banding artifact could be provided by a user before this step or could be read from a look up table. Increasing the threshold value will translate into detection of less artifacts. Decreasing the threshold value will translate into the detection of more artifacts. The selection of a given threshold can be based on content type and/or any other available information If the gradient detection operators exceed a predetermined threshold, the corresponding pixels are declared as a part of a banding artifact and such an area is marked as such (924). Otherwise, the corresponding area is identified as not a part of the banding artifacts and marked as such (910). As this stage a determination is made as to whether this area is the last area in the video picture/frame (926). If yes, another determination is made as to whether this is the last picture/frame in the video sequence of picture (928). If the outcome in step 926 is no, the process starts over at step 904. If the outcome of step 928 is no, a new picture is analyzed in step 902 and the process repeats. If there are no more pictures in the video sequence, the process ends at step 930.

As mentioned above, when the original video information is available, such information can be used as a reference. This process enables the distinguishing of the artifacts created by the compression process of the original video information from artifacts that are part of the original video content. Therefore, it is important to separate the contours existing in the original from the contours caused by the video compression process. The gradient in pixel level of both reconstructed and the original are compared (steps 918, 920 in FIG. 9). As used herein, "gradient distortion" is defined as the measure to decide how the gradients of pixel of the reconstructed video data are distorted from the original. The example of the gradient distortion computation can be computed as $$D_G(i, j) = \frac{2 \times G_{x,p}(i, j) \times G_{x,p,org}(i, j)}{G_{x,p}(i, j)^2 + G_{x,p,org}(i, j)^2} \times \frac{2 \times G_{y,p}(i, j) \times G_{y,p,org}(i, j)}{G_{y,p}(i, j)^2 + G_{y,p,org}(i, j)^2}, \quad (4)$$

where $G_{x,p,org}(i,j)$ and $G_{y,p,org}(i,j)$ are the gradients in the pixel level of x- and y-direction from the mask image of the original video data, respectively, at position (i,j). $G_{x,p}(i,j)$ and $G_{y,p}(i,j)$ are the gradients in the pixel level of x- and y-direction from the mask image of the reconstructed video data, respectively, at position (i,j). When $D_G(i,j)$ is close to one, such a determination means that the gradient at position (i,j) in the processed or reconstructed video frame is not different so much compared to the original. When $D_G(i,j)$ approaches zero, this value means that there is significant difference between the processed or reconstructed video frame and the original video frame, $D_G(i,j)$ is compared with the threshold value (922). If $D_G(i,j)$ exceeds a threshold value, the pixel will be declared as a part of banding artifact. Image areas containing pixels declared as a part of a banding artifact will be marked (924) as the areas containing banding artifacts. By way of example, a macroblock containing pixels declared as a part of the banding artifacts will be marked as detected area.

The implementations described herein can be implemented in, for example, a method or process, an apparatus, or a software program. Even if only discussed in the context of a single form of implementation (for example, discussed only as a method), the implementation of features discussed can be also implemented in other forms (for example, an apparatus or program). An apparatus can be implemented in, for example, appropriate hardware, software, and firmware. The methods can be implemented in, for example, an apparatus such as, for example, a processor, which refers to processing devices in general, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Implementations of the various processes and features described herein can be embodied in a variety of different equipment or applications, particularly, for example, equipment or applications associated with data transmission and reception. Examples of equipment include video coders, video decoders, video codecs, web servers, set-top boxes, laptops, personal computers, other communication devices, and mobile devices.

Additionally, the methods can be implemented by instructions being performed by a processor, and such instructions can be stored on a processor-readable medium such as, for example, an integrated circuit, a software carrier or other storage device such as, for example, a hard disk, a compact diskette, a random access memory ("RAM"), or a read-only memory ("ROM"). The instructions can form an application program tangibly embodied on a processor-readable medium. As should be clear, a processor can include a processor-readable medium having, for example, instructions for carrying out a process.

As should be evident to one of skill in the art, implementations can also produce a signal formatted to carry information that can be, for example, stored or transmitted. The information can include, for example, instructions for performing a method, or data produced by one of the described implementations. Such a signal can be formatted, for example, as an electromagnetic wave (for example, using a radio frequency portion of spectrum) or as a baseband signal. The formatting can include, for example, encoding a data stream, packetizing the encoded stream, and modulating a carrier with the packetized stream. The information that the signal carries can be, for example, analog or digital information. The signal can be transmitted over a variety of different wired or wireless links, as is known.

A number of implementations have been described. Nevertheless, it will be understood that various modifications can be made. For example, elements of different implementations can be combined, supplemented, modified, or removed to produce other implementations. Additionally, one of ordinary skill will understand that other structures and processes can be substituted for those disclosed and the resulting implementations will perform at least substantially the same function(s), in at least substantially the same way(s), to achieve at least substantially the same result(s) as the implementations disclosed. Accordingly, these and other implementations are within the scope of the following claims.

The invention claimed is:

1. A method of processing digital video content comprising the steps of:
   dividing at least one area of a video picture from said digital video content into blocks;
   computing an average pixel value for each of said blocks;
   forming a DC plane comprising a plurality of the average pixel values;
   computing a gradient for each of the plurality of said average pixel values of said DC plane;
   computing at least a mean and variance of the gradients to determine whether said at least one area is at least one of a texture area, a smooth area, and a slow change area by comparing said at least a mean and variance to a respective threshold value;
   excluding said at least one area from banding artifact detection if said at least one area is categorized as the texture area; and
   detecting whether said at least one area of said video picture has a banding artifact if said at least one area is categorized as the smooth area or the slow change area.

2. The method of claim 1, comprising the step of scaling said at least one area if said at least one area is categorized as the smooth area or the slow change area.

3. The method of claim 1, comprising the step of:
   categorizing said at least one area of said video picture as having said banding artifact based on local gradients.

4. The method of claim 1, and said method comprises the additional steps of:
   marking said at least one area as the texture area when the at least a mean and variance is greater than said respective threshold; and
   marking said at least one area as at least one of the smooth area and the slow change area when one of the at least a mean and variance value is less than said respective threshold.

5. The method of claim 1, wherein said excluding step comprises:
   replacing said at least one area with a constant value if said at least one area is categorized as the texture area.

6. The method of claim 1, wherein said detecting step further comprises:
   applying a pixel based gradient computation to determine a local gradient, wherein the detecting step is responsive to the local gradient.

7. A program storage device having an application program tangibly embodied thereon, the application program including instructions for performing at least the following on a video picture from a sequence of video pictures:
   dividing at least one area of said video picture from said sequence of video pictures into blocks;
   computing an average pixel value for each of said blocks;
   forming a DC plane comprising a plurality of the average pixel values;
   computing a gradient for each of the plurality of said average pixel values of said DC plane;
   computing at least a mean and variance of the gradients;
   comparing the at least a mean and variance of the gradients to a respective threshold;
   marking said at least one area as a texture area when the at least a mean and variance is greater than said respective threshold;
   marking said at least one area as at least one of a smooth area and a slow change area when the at least a mean and variance value is less than said respective threshold;
   excluding said at least one area from banding artifact detection if said at least one area is categorized as the texture area; and
   detecting banding artifacts in said at least one area if said at least one area is categorized as the smooth area or the slow change area.

8. An apparatus for processing digital video content, comprising:
   a banding artifact detector configured to
   divide at least one area of a video picture from said digital video content into blocks;
   compute an average pixel value for each of said blocks;
   form a DC plane comprising a plurality of the average pixel values;
   compute a gradient for each of the plurality of said average pixel values of said DC plane;
   compute at least a mean and variance of the gradients as to determine whether said at least one area is at least one of a texture area, a smooth area, and a slow change area by comparing said at least a mean and variance to a respective threshold value;
   exclude said at least one area from banding artifact detection if said at least one area is categorized as the texture area; and
   detect whether said at least one area has a banding artifact if said at least one area is categorized as the smooth area or the slow change area.

9. The apparatus of claim 8, wherein the banding artifact detector further performs:
   marking said at least one area as the texture area when the at least a mean and variance is greater than said respective threshold; and
   marking said at least one area as at least one of the smooth area and the slow change area when one of the at least a mean and variance value is less than said respective threshold.

* * * * *